United States Patent
Shin et al.

(10) Patent No.: US 9,250,727 B2
(45) Date of Patent: Feb. 2, 2016

(54) MOBILE TERMINAL AND METHOD FOR FABRICATING THE SAME

(71) Applicants: Seungyong Shin, Seoul (KR); Seungsu Yang, Gyeonggi-Do (KR); Daeho Kim, Gyeonggi-Do (KR); Kwonjin Kang, Seoul (KR); Myungcheol Baek, Seoul (KR)

(72) Inventors: Seungyong Shin, Seoul (KR); Seungsu Yang, Gyeonggi-Do (KR); Daeho Kim, Gyeonggi-Do (KR); Kwonjin Kang, Seoul (KR); Myungcheol Baek, Seoul (KR)

(73) Assignee: LG Electronics Inc., Seoul (KR)

( * ) Notice: Subject to any disclaimer, the term of this patent is extended or adjusted under 35 U.S.C. 154(b) by 239 days.

(21) Appl. No.: 13/745,260

(22) Filed: Jan. 18, 2013

(65) Prior Publication Data

US 2013/0194212 A1 Aug. 1, 2013

(30) Foreign Application Priority Data

Jan. 30, 2012 (KR) ......................... 10-2012-0009103

(51) Int. Cl.
*G06F 3/041* (2006.01)
*G06F 1/16* (2006.01)
*G06F 3/044* (2006.01)

(52) U.S. Cl.
CPC .............. *G06F 3/041* (2013.01); *G06F 1/1626* (2013.01); *G06F 3/044* (2013.01); *G06F 2203/04103* (2013.01)

(58) Field of Classification Search
CPC ........ G06F 3/041; G06F 3/044; G06F 1/1626

USPC .................................................. 345/173–175
See application file for complete search history.

(56) References Cited

U.S. PATENT DOCUMENTS

| 2006/0223346 | A1* | 10/2006 | Fujii et al. ..................... 439/76.2 |
| 2011/0109590 | A1* | 5/2011 | Park .............................. 345/174 |
| 2011/0151937 | A1* | 6/2011 | Kusuda ................ G06F 1/1626 455/566 |
| 2011/0227846 | A1* | 9/2011 | Imazeki ....................... 345/173 |

FOREIGN PATENT DOCUMENTS

| EP | 1 698 965 A1 | 9/2006 |
| EP | 2 378 399 A2 | 10/2011 |

OTHER PUBLICATIONS

European Search Report issued in Application No. 13000332.0 dated Sep. 12, 2014.
Anonymous: "Printed circuit board—Wikipedia, the free encyclopedia", Sep. 25, 2011, XP055131700, Retrieved from the Internet.

* cited by examiner

*Primary Examiner* — Amare Mengistu
*Assistant Examiner* — Sarvesh J Nadkarni
(74) *Attorney, Agent, or Firm* — KED & Associates LLP

(57) ABSTRACT

The present disclosure proposes a mobile terminal including a display, a window to cover the display, the window having a central region and an edge region, a touch pattern unit on a surface of the window, the touch pattern unit to define a sensing channel for a touch input applied to the window, and a signal transfer unit to cover at least a portion of the edge region of the window, the signal transfer unit to electrically connect to the touch pattern unit and provide a signal transfer path, and the signal transfer unit is formed of a colored material and is outwardly exposed from the edge region.

9 Claims, 16 Drawing Sheets

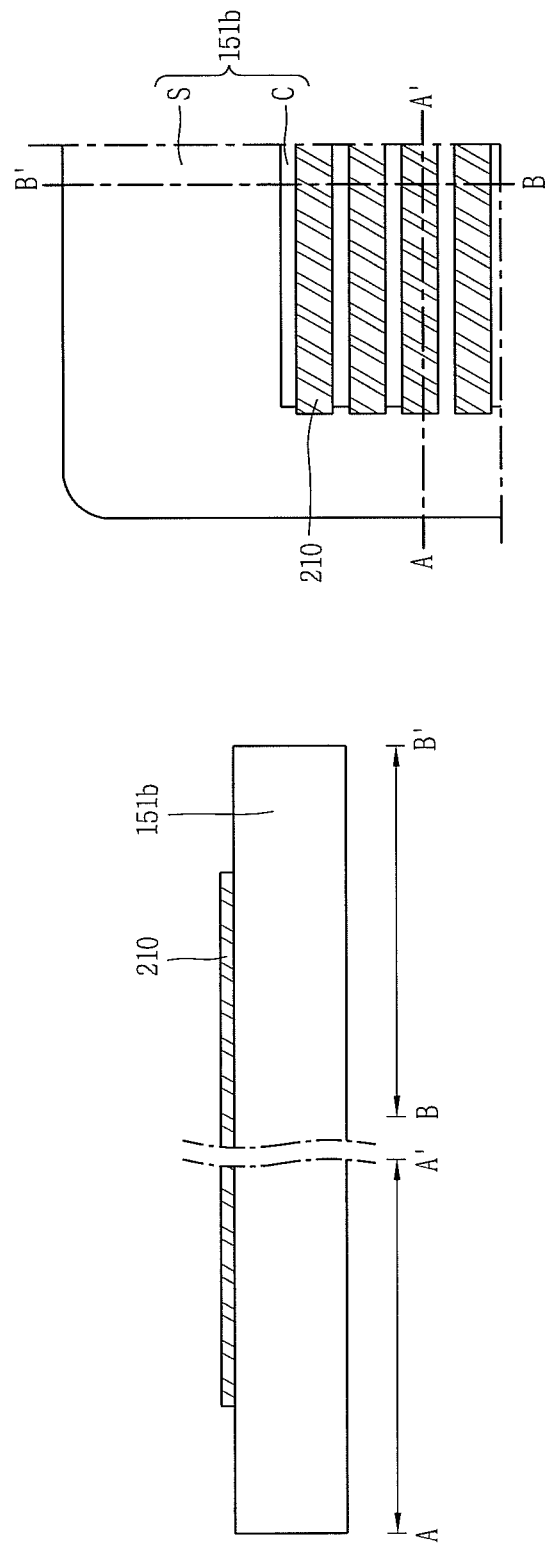

MOBILE TERMINAL AND METHOD FOR FABRICATING THE SAME

CROSS-REFERENCE TO RELATED APPLICATION

Pursuant to 35 U.S.C. §119(a), this application claims the benefit of earlier filing date and right of priority to Korean Application No. 10-2012-0009103, filed on Jan. 30, 2012, the contents of which is incorporated by reference herein in its entirety.

BACKGROUND OF THE INVENTION

1. Field of the Invention

This specification relates to a mobile terminal having a touch-sensitive input structure.

2. Background of the Invention

Mobile terminals are electronic devices which are portable and have at least one of voice and telephone call functions, information input and/or output functions, a data storage function and the like.

As it becomes multifunctional, the mobile terminal can be allowed to capture still images or moving images, play music or video files, play games, receive broadcast and the like, so as to be implemented as an integrated multimedia player.

Various attempts have been done for the multimedia device in aspect of hardware or software in order to implement such complicated functions. Among those attempts, improvement of the hardware configuration may be considered.

As the mobile terminals are regarded as personal belongings to express personalities, various design factors are required. Such design factors include structural changes and improvement for making an appearance of the mobile terminal better.

In recent time, in order to fabricate a mobile terminal providing a convenient user interface with a simpler appearance, a touch-sensitive input mechanism is employed. At a general process, a colored layer is printed to cover an edge region of a window, a touch pattern layer is then deposited on a central region of the window corresponding to a display, and an electrode layer electrically connected to the touch pattern layer is formed on the colored layer.

With this structure and fabrication method, the colored layer is discolored due to high temperature upon deposition of the touch pattern layer, and damaged during etching of the touch pattern layer. Further, the touch pattern layer may be damaged at a stepped portion between the colored layer and the touch pattern layer. In addition, implementation of a precise electrode layer may be impossible due to luminance of the colored layer and foreign materials added during processes.

SUMMARY OF THE INVENTION

Therefore, to address the shortcomings of the related art, an aspect of the detailed description is to provide a mobile terminal having a touch input structure with more improved reliability, and a fabricating method thereof.

To achieve these and other advantages and in accordance with the purpose of this specification, as embodied and broadly described herein, there is provided a mobile terminal including a display to output visual information thereon, a window disposed to cover the display, the window having a central region corresponding to the display and an edge region surrounding the central region, a touch pattern unit formed on one surface of the window, and defining a sensing channel for a touch input applied onto the central region, and a signal transfer unit disposed to cover the edge region, and electrically connected to the touch pattern unit to define a signal transfer path, the signal transfer unit being formed of a colored material and outwardly exposed via the edge region.

In accordance with one exemplary embodiment, the signal transfer unit may implement a color of the edge region.

In accordance with anther exemplary embodiment, the mobile terminal may further include a colored layer formed on the edge region excluding the signal transfer unit so as to define an appearance of the edge region together with the signal transfer unit.

The touch pattern unit may be disposed to be covered with the colored layer other than covering the colored layer. The colored layer may have the same color as the signal transfer unit to provide a unified color to the edge region.

The signal transfer unit may include a connection portion electrically connected to a flexible printed circuit board, and the colored layer may be printed or deposited to cover the signal transfer unit excluding the connection portion. Also, the mobile terminal may further include a conductive portion filled in an empty space on the connection portion to electrically connect the connection portion to the flexible printed circuit board.

In accordance with anther exemplary embodiment, the signal transfer unit may be formed to fully cover the edge region, to allow the edge region to have a distinguishable color from the central region.

The signal transfer unit may include a routing electrode to electrically connect the touch pattern unit to the flexible printed circuit board, and an etched portion electrically separating each signal transfer unit along the sensing channel to form the routing electrode having a different path. The signal transfer unit may further include a dummy electrode electrically separated from the touch pattern unit by the etched portion, and defining the appearance of the edge region together with the routing electrode.

In accordance with anther exemplary embodiment, the signal transfer unit may include a base formed of a conductive material for allowing a current flow, and a colored layer formed by coloring at least part of the base to implement a color of the edge region.

In accordance with anther exemplary embodiment, the signal transfer unit may be opaque, and fully cover the edge region.

In accordance with anther exemplary embodiment, an upper surface of the touch pattern unit may be formed to have a uniform height from the window at a random position.

In accordance with anther exemplary embodiment, the touch pattern unit may extend toward the edge region to sense a touch input applied onto the edge region. The mobile terminal may further include a touch input unit limited on the edge region by the signal transfer unit to form an image, and receive a touch input applied onto the image through the touch pattern unit.

In accordance with anther exemplary embodiment, the touch pattern unit may be formed of the same material as the signal transfer unit to form a specific pattern, and configured not to interfere with visual information output on the display. The touch pattern unit may include nano-scale metal lines forming a grid on a portion of the window, the portion corresponding to the display.

To achieve these and other advantages and in accordance with the purpose of this specification, as embodied and broadly described herein, there is provided a method for fabricating a mobile terminal including forming a touch pattern unit on a window to define a sensing channel for a touch input applied onto a central region of the window, forming a routing electrode on an edge region surrounding the central region, the routing electrode defining a signal transfer path by being electrically connected to the touch pattern unit and being formed of a colored material to be externally exposed via the edge region, masking a connection portion of the routing electrode, the connection portion electrically connected to a flexible printed circuit board, forming a colored layer covering the edge region, the colored layer implementing a color of the edge region together with the routing electrode, and filling a conductive portion in an empty space on the connection portion to electrically connect the connection portion to the flexible printed circuit board.

In addition, in accordance with another exemplary embodiment to achieve the aspect of the present disclosure, there is also provided a method for fabricating a mobile terminal including forming a touch pattern unit on a window to define a sensing channel for a touch input applied onto a central region of the window, forming an electrode layer on an edge region surrounding the central region, the electrode layer being formed of a colored material to implement a color of the edge region, etching the electrode layer to be electrically separated along the sensing channel, and electrically connecting the electrode layer to a flexible printed circuit board.

In accordance with another exemplary embodiment, the electrode layer may be divided by the etching into a routing electrode to electrically connect the touch pattern unit to the flexible printed circuit board, and a dummy electrode electrically separated from the touch pattern unit, the dummy electrode defining an appearance of the edge region together with the routing electrode.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIGS. 6A to 6D are process views showing a fabricating method for implementing a touch input structure on a window shown in FIG. 4 and an edge region of the window;

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

For the sake of brief description with reference to the drawings, the same or equivalent components will be provided with the same reference numbers, and description thereof will not be repeated. The expression in the singular form in this specification will cover the expression in the plural form unless otherwise indicated obviously from the context.

Hereinafter, suffixes "module" and "unit or portion" for components used herein in description are merely provided only for facilitation of preparing this specification, and thus they are not granted a specific meaning or function.

Mobile terminals described in this specification may include cellular phones, smart phones, laptop computers, digital broadcasting terminals, personal digital assistants (PDAs), portable multimedia players (PMPs), E-books, navigators, and the like.

However, it may be easily understood by those skilled in the art that the configuration according to the exemplary embodiments of this specification can be applied to stationary terminals such as digital TV, desktop computers and the like excluding a case of being applicable only to the mobile terminals.

Figure 1:
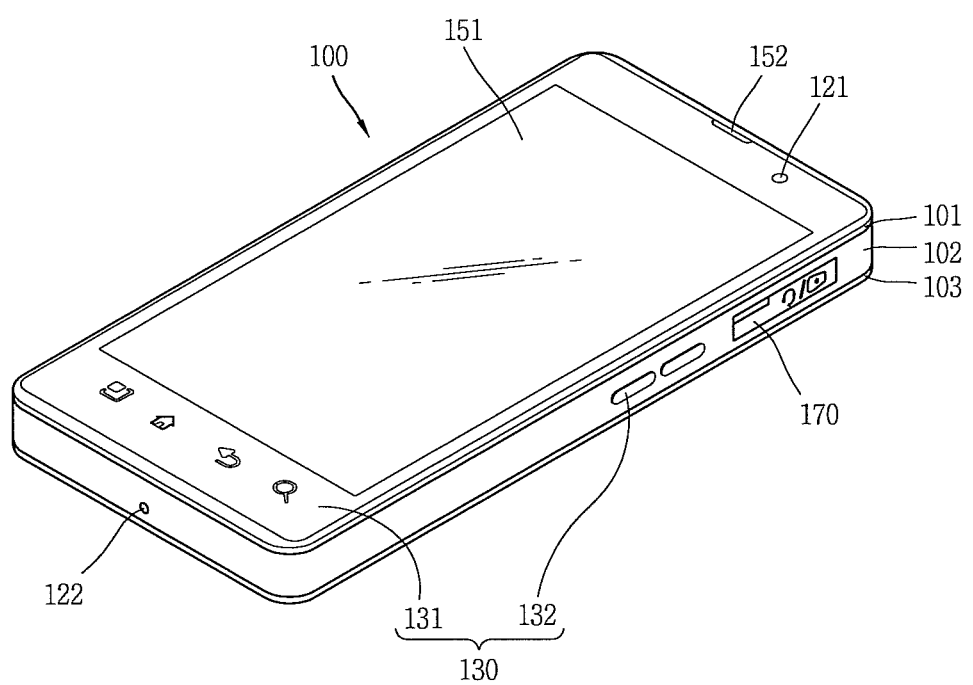
FIG. 1 is a front perspective view of a mobile terminal in accordance with one exemplary embodiment.

FIG. 1 is a front perspective view of a mobile terminal 100 in accordance with one exemplary embodiment;

The mobile terminal 100 shown in FIG. 1 is a bar type mobile terminal. However, this detailed description may be applicable, but not limited to, a various structures, such as a slide type, a folder type, a swing type, a swivel type and the like, having two or more bodies coupled to be relatively movable with each other.

A terminal body may include a case (or referred to as casing, housing, cover, etc.) defining an appearance of the mobile terminal 100. In this exemplary embodiment, the case may be divided into a front case 101 and a rear case 102 covering an opposite surface to the front case 101. At least one intermediate case may further be disposed between the front and the rear cases 101 and 102. A battery cover 103 for covering a power supply unit 190 may be detachably disposed on the rear case 102.

A space formed between the front and rear cases 101 and 102 may accommodate various electronic components. Such cases may be injected using a synthetic resin or be formed of a metal, such as stainless steel (STS), titanium (Ti), aluminum (Al) or the like.

The front surface of the terminal body is shown having a display unit 151, a first audio output module 152, a first camera 121, a user input unit (signal input unit) 130 and the like, and a side surface thereof is shown having an audio input unit 122, an interface unit 170 and the like.

The display unit 151 may include a Liquid Crystal Display (LCD) module, an Organic Light Emitting Diodes (OLED) module, an e-paper and the like which outputs visual information thereon.

The display unit 151 may include a touch sensor for allowing a touch input. When the touch sensor senses a touch input on a specific point on the display unit 151, a content corresponding to the touched point may be input. Contents input by the touch manner may include text or numerals or menu items which are instructed or selected in various modes.

The touch sensor may be transparent such that the display unit 151 can be viewed, and have a structure for enhancing visibility of a touch screen at a bright place. In FIG. 1, the display unit 151 may occupy most of the front surface of the front case 102.

The first audio output module 152 and the first camera 121 may be disposed at a region adjacent to one of both end portions of the display unit 151, and a signal input unit 131 and the audio input unit 122 may be disposed at a region adjacent to another end. A signal input unit 132, an interface unit 170 and the like may be disposed at a side surface of the terminal body.

The first audio output module 152 may be implemented as a receiver to transfer a call sound to a user's ear, or a load speaker for outputting various alarm sounds or multimedia reproduction sounds.

The first camera 121 may receive and process image frames of still pictures or video obtained by image sensors in a video call mode or a capturing mode. The processed image frames may be displayed on a display unit 151.

The signal input unit 130 may be manipulated to allow inputting of commands for controlling operations of the mobile terminal 100, and include a plurality of first and second manipulation units 131, 132. The plurality of first and second manipulation units 131, 132 may be referred to as a manipulating portion. Such manipulating portion can employ any tactile manner that a user can touch or tap for manipulation.

The first and second manipulation units 131, 132 may be set to allow inputting of various contents. For example, the first manipulation unit 131 may be configured to input commands such as START, END, SCROLL or the like, and the second manipulation unit 132 may be configured to input commands, such as a volume adjustment of sounds output from the first audio output module 152, conversion of the display unit 151 into a touch recognition mode, or the like.

The audio input unit 122 may be implemented, for example, as a microphone for receiving user's voice, other sounds and the like.

The interface unit 170 may serve as a path for data exchange between the mobile terminal 100 and external devices. For example, the interface unit 170 may be at least one of wired/wireless earphone ports, ports for short-range communication (e.g., IrDA, Bluetooth, WLAN, etc.), power supply terminals for power supply to the mobile terminal and the like. The interface unit 124 may be a card socket for coupling to external cards, such as a Subscriber Identity Module (SIM), a User Identity Module (UIM), a memory card for storage of information and the like.

Figure 2:
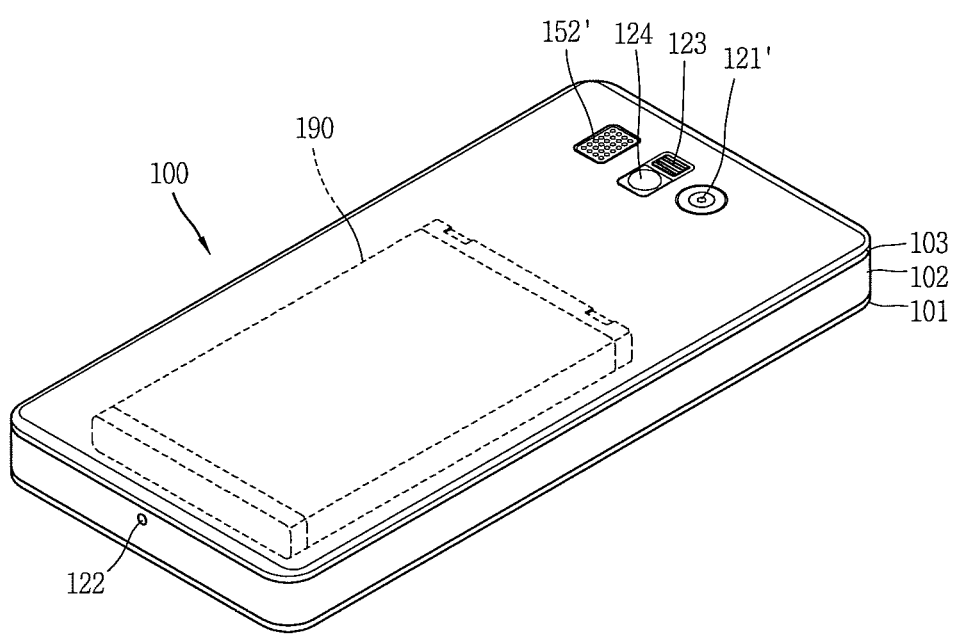
FIG. 2 is a rear perspective view of the mobile terminal shown in FIG. 1.

FIG. 2 is a rear perspective view of the mobile terminal 100 shown in FIG. 1.

Referring to FIG. 2, the rear surface of the terminal body is further shown having a second camera 121'. The second camera 121' faces a direction which is substantially opposite to a direction faced by the first camera 121 (see FIG. 1). Also, the second camera 121' may be a camera having different pixels from those of the first camera 121.

For instance, the first camera 121 may operate with relatively lower pixels (lower resolution). Thus, the first camera 121 may be useful when a user can capture his face and send it to another party during a video call or the like. On the other hand, the second camera 121' may operate with relatively higher pixels (higher resolution) such that it can be useful for a user to obtain higher quality pictures for later use. The first and second cameras 121 and 121' may be installed in the terminal body to be rotatable or popped up.

A flash 123 and a mirror 124 may be disposed adjacent to the second camera 121'. The flash 123 operates in conjunction with the second camera 121' when taking a picture using the second camera 121'. The mirror 124 can cooperate with the second camera 121' to allow a user to photograph himself in a self-portrait mode.

A second audio output module 152' may further be disposed on the rear surface of the terminal body. The second audio output module 152' may cooperate with the first audio output unit 152 (see FIG. 1) to provide stereo output in a phone-call mode.

A broadcast signal receiving antenna (not shown) may further be disposed at the side surface of the terminal body, in addition to an antenna for call connection. The antenna forming a part of the broadcast receiving module may be retractably into the terminal body.

The terminal body is shown having a power supply unit 190 for supplying power to the mobile terminal 100. The power supply unit 190 may be implemented as a battery for converting chemical energy into electrical energy, and the battery may be mounted inside the terminal body or detachably coupled to the terminal body.

For providing a convenient user interface with a more simplified appearance, the mobile terminal 100 may include a touch sensor. Hereinafter, description will be given in more detail of a structure of the touch sensor implemented in the display unit 151 and a fabricating method thereof.

Figure 3:
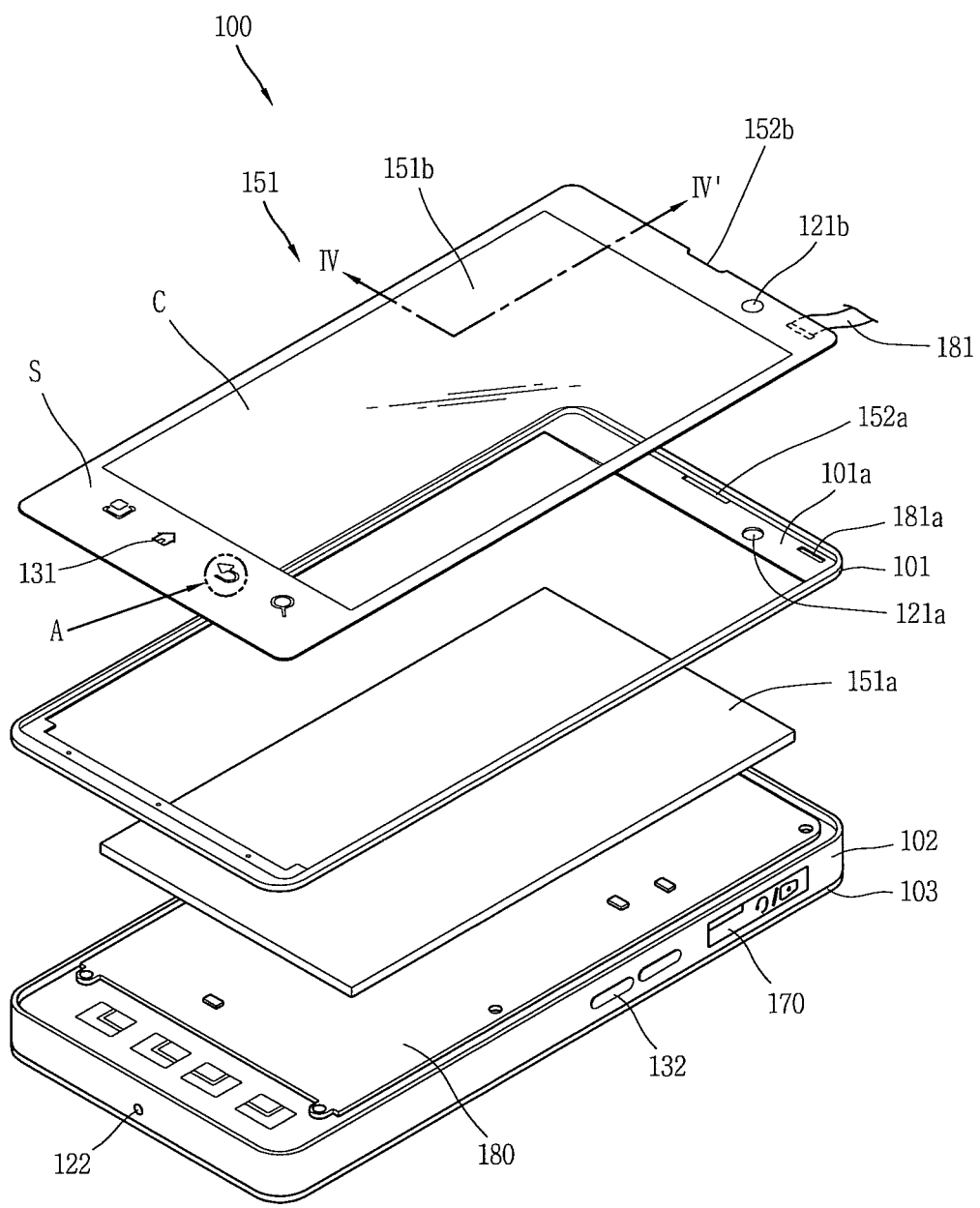
FIG. 3 is a disassembled perspective view of the mobile terminal shown in FIG. 1.

FIG. 3 is a disassembled perspective view of the mobile terminal 100 shown in FIG. 1, which shows a configuration of the display unit 151 in the mobile terminal 100.

As shown in FIG. 3, a circuit board 180 may be disposed within a terminal main body. The circuit board 180 may be mounted onto the rear case 102, as shown in the drawing, or within a separate inner structure. The circuit board 180 may be configured as one example of a controller for operating various functions of the mobile terminal 100.

One surface of the circuit board 180 may be shown having a display 151a electrically connected to the circuit board 180. The display 151a may have an area corresponding to a light transmittable region of a window 151b. This may allow a user to recognize visual information output on the display 151a from the exterior.

The front case 101 may be shown having a bezel 101a recessed into one surface such that a part of the window 151b is mounted thereon. In another example, the bezel 101a may be separately formed at the front case 101.

The bezel 101a may be provided with a hole 121a corresponding to the first camera 121, and a sound hole 152a corresponding to a first audio output module 152. The sound hole 152a may be located adjacent to a side wall of the front case 101. A through hole 181a through which a flexible printed circuit board 181 is inserted may be formed through the bezel 101a. The through hole 181a may be formed through a bottom surface or a side surface of the bezel 101a.

The window 151b may be coupled to the bezel 101a. The window 151b may be made of a light-transmittable material, for example, transparent synthetic resin, tempered glass, and the like.

The window 151b may be divided into a central region C corresponding to the display 151a, and an edge region S surrounding the central region C. The central region C may preferably be formed of a colorless, transparent material such that visual information output on the display 151a can be recognized from the outside as it is. The edge region C may be colored and/or opaque to prevent a mechanical structure within the terminal main body from being externally exposed.

A transparent window 121b may be implemented by forming the edge region S except for a portion corresponding to the hole 121a. Also, a recess 152b may be formed on a side surface of the window 151b, which is disposed to face a side wall of the front case 101 to form an assembly gap. With the structure, a sound generated from the first audio output module 152 may be output via the assembly gap between the front case 101 and the window 151b. Any hole which is independently formed to output sound may not be visible from the outside, more simplifying the appearance of the mobile terminal 100.

The display 151a and the window 151b may configure the display unit 151 (see FIG. 1).

Figure 4:
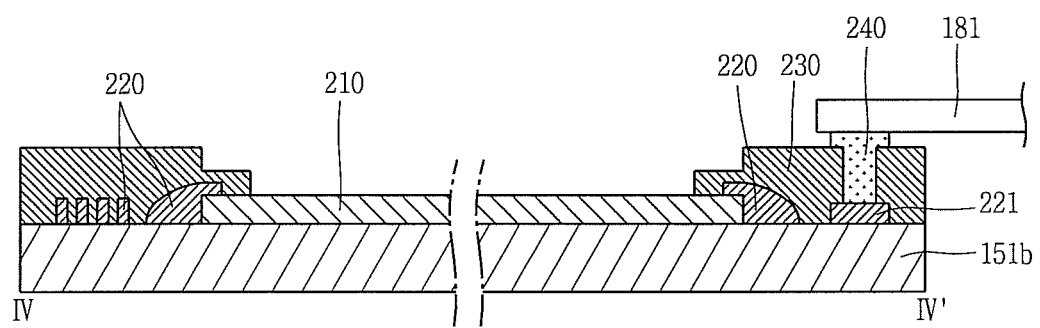
FIG. 4 is a sectional view of a window taken along the line IV-IV' of FIG. 3.
Figure 5:
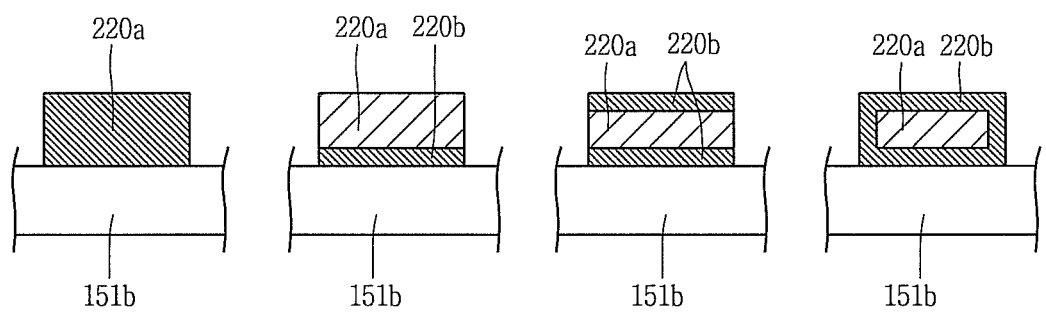
FIG. 5 shows conceptual views of a structure of a signal transfer unit shown in FIG. 4.
Figure 6B:
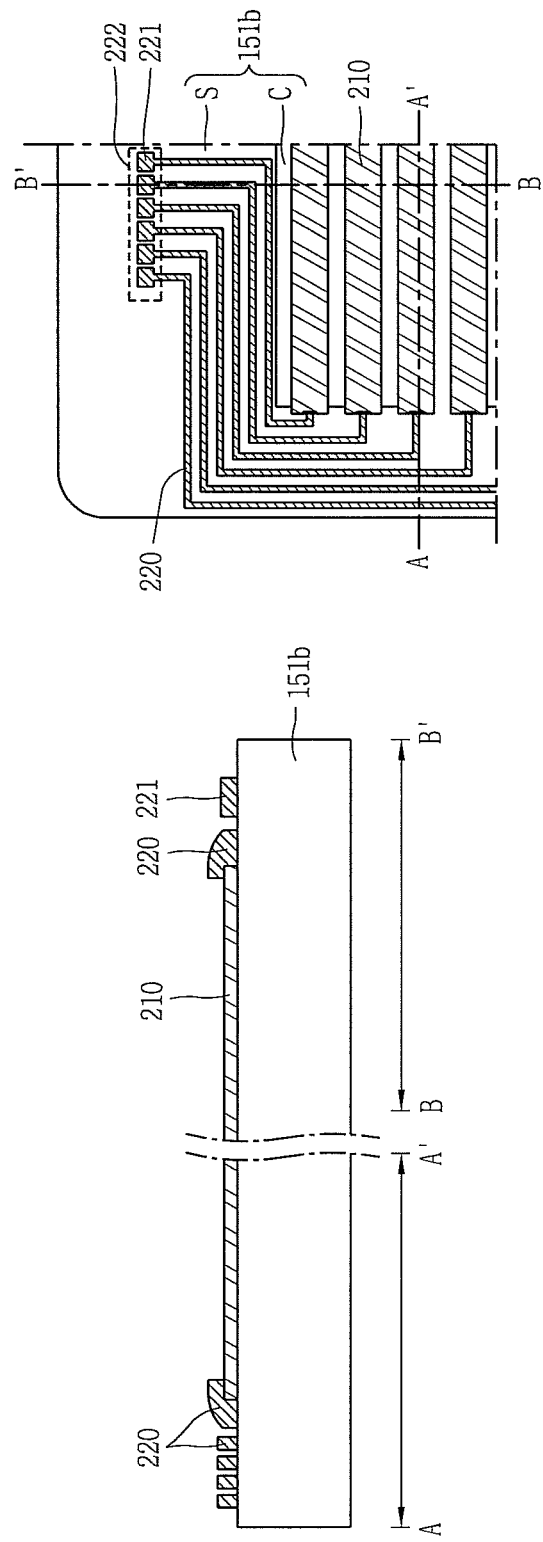
Figure 6C:
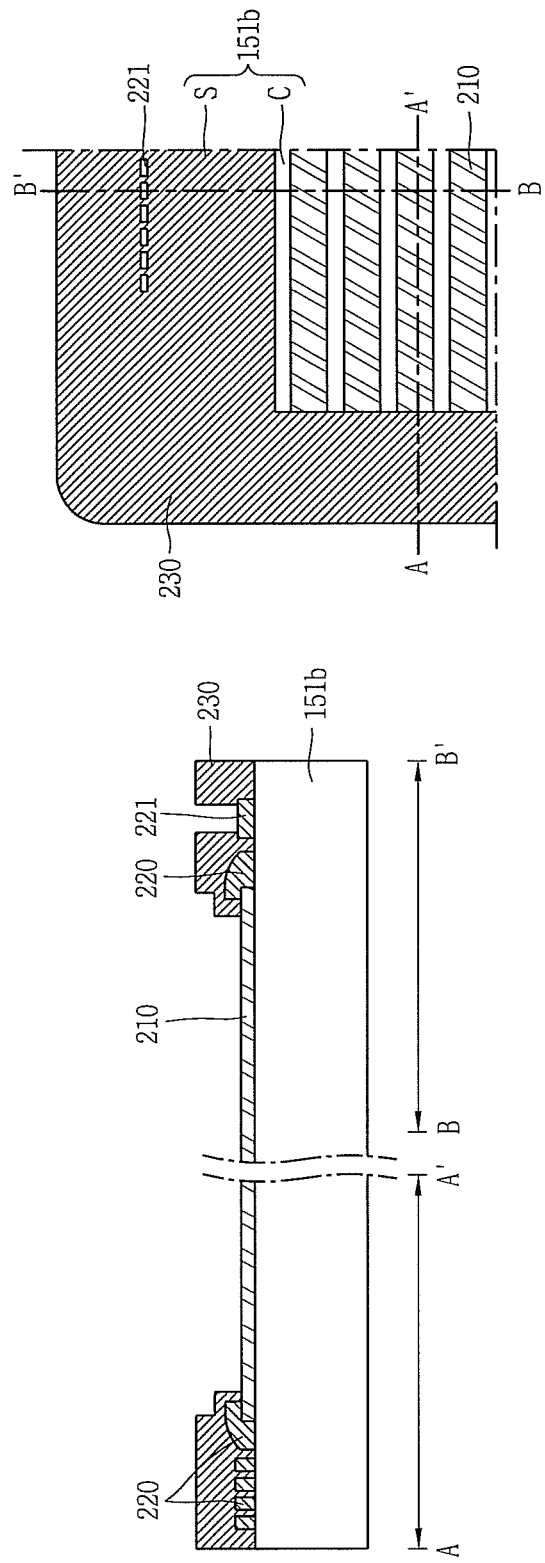
Figure 6D:
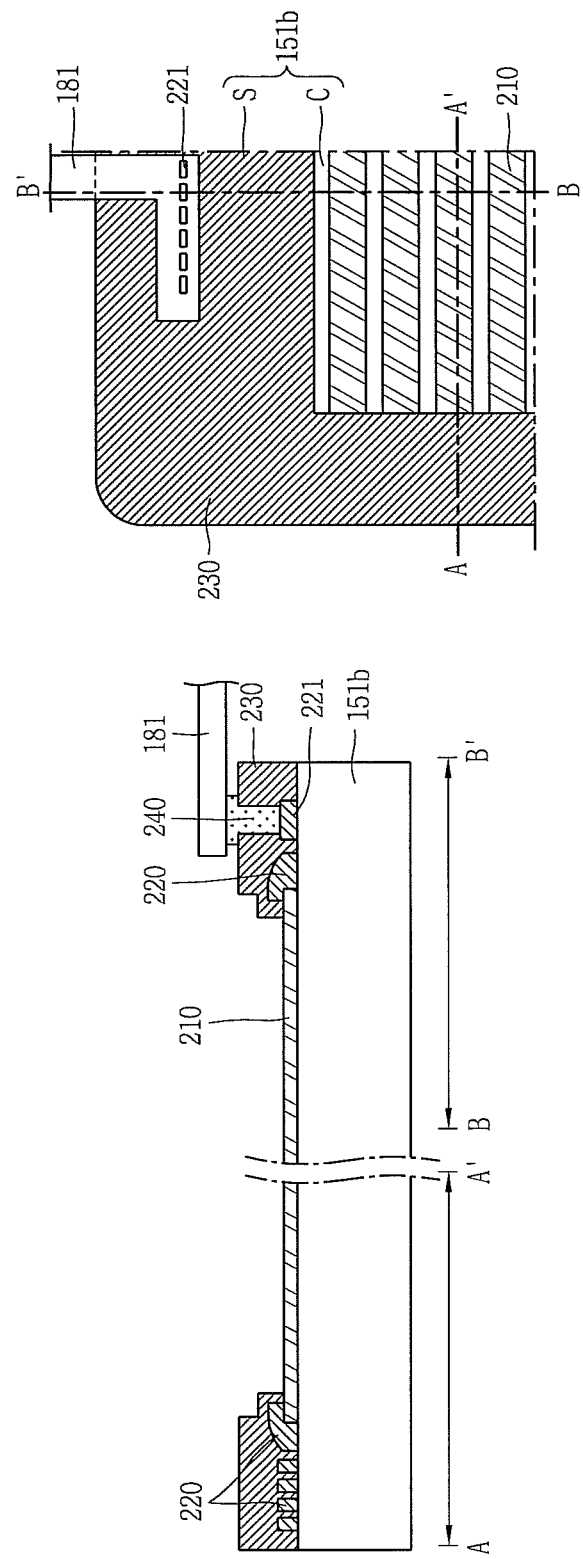

FIG. 4 is a sectional view of the window 151b taken along the line IV-IV' of FIG. 3, and FIG. 5 shows conceptual views of a structure of a signal transfer unit shown in FIG. 4.

As shown in FIG. 4, a touch pattern unit 210 defining a sensing channel for a touch input applied onto the central region C may be formed on one surface of the window 151b. The one surface may be a rear surface of the window 151b facing the bezel 101a. The touch pattern unit 210 may be implemented in a form that a transparent conductive film such as an Indium Tin Oxide (ITO) film, Carbon NanoTube (CNT) film or the like is deposited on the window 151b at high temperature.

The touch pattern unit 210 may include first and second pattern layers formed on the central region C in preset patterns. In the drawings, the pattern layers are conceptually shown for easy understanding of a connection between the touch pattern unit 210 and a signal transfer unit 220.

The first pattern layer may extend in a first direction (for example, a widthwise direction of the window 151b), and the second pattern layer may extend in a second direction perpendicular to the first direction (for example, a lengthwise direction of the window 151b) so as to form a sensing channel together with the first pattern layer.

The preset patterns may be include various patterns, such as a diamond pattern, a circular pattern, a zigzag pattern and the like. An insulating portion may be disposed between the first pattern layer and the second pattern layer for electrical insulation between the first and second pattern layers. For example, the insulating portion may have a bridge-like shape which crosses over the first pattern layer, and the second pattern layer may cover the insulating portion.

The touch pattern unit 210 may measure a change in a quantity of electric charge in the first and second directions by means of the first and second pattern layers. The touch pattern unit 210 may be electrically connected to the circuit board 180 having a detecting unit (not shown) via a connection structure connected in sequence of the signal transfer unit 220, a conductive unit 240 and the flexible printed circuit board 181. The detecting unit may detect a touch input based on the change in the quantity of electric charge sensed from each of the first and second pattern layers.

For example, when the window 151b is touched by a conductive portion such as a finger or a touch pen, electrons located on the window 151b moves to the conductive portion. The touch pattern unit 210 then senses the change in the quantity of electric charge, measuring coordinates. The touch pattern unit 210 may detect even touch pressure as well as touch position and touch area.

A signal transfer unit 220 may be formed on a portion corresponding to the edge region S of the window 151b. The signal transfer unit 220 may be electrically connected to the touch pattern unit 210 to define a signal transfer path. The signal transfer unit 220 may be formed of a colored material to be externally exposed through the edge region S, thereby implementing a color of the edge region S. The signal transfer unit 220 may be interpreted as a routing electrode through which the touch pattern unit 210 and the flexible printed circuit board 181 are connected to each other.

Referring to FIG. 5, the signal transfer unit 220 may have a colored surface through a chemical method. The signal transfer unit 220 may structurally include a base 220a and a colored layer 220b.

The base 220a may be made of a conductive material for allowing a current to flow thereon. The colored layer 220b may have at least part colored, thereby implementing a color of the edge region S. The colored layer 220b may be formed on one surface of the base 220a which is exposed through the window 151b, formed to fully surround the base 220a, or implemented as the base 220a is fully colored.

The signal transfer unit 220 may be formed by a method of attaching a separate colored layer 220b having a specific color onto the base 220a, instead of using the chemical method.

Referring back to FIG. 4, a colored layer 230 may be formed on a portion of the edge region S except for the signal transfer unit 220, thereby completely defining an appearance of the edge region S. The colored layer 230 may be formed through printing, deposition or the like using silk screen printing.

The colored layer 230 may define the appearance of the edge region S together with the signal transfer unit 220. The colored layer 230 may have the same color as the signal transfer unit 220 to provide a unified color to the edge region S.

With the structure, the touch pattern unit 210 may be covered by the colored layer 230, other than covering the colored layer 230. Hence, problems, which may be caused when employing the conventional structure that the touch pattern unit 210 is formed after formation of the colored layer 230 and a fabrication method thereof, may be avoided.

In detail, discoloration of the colored layer 230 due to high temperature upon deposition of the touch pattern unit 210, damage on the colored layer 230 upon etching of the touch pattern unit 210, and damage on the touch pattern layer 210 caused on a stepped portion between the colored layer 230 and the touch pattern layer 210 may be prevented. Also, since the signal transfer unit 220 is formed directly on the sleek window 151b, the signal transfer unit 220 may be implemented more precisely. This may result in improving a process yield ratio and providing a mobile terminal 100 having the touch input structure with more improved reliability.

The signal transfer unit 220 may include a connection portion 221 electrically connected to the flexible printed circuit board 181. The connection portion 221 may be formed at one end portion of the signal transfer unit 220. The connection portions 221 formed at each signal transfer path may be combined to form a terminal part 222. The colored layer 230 may be printed or deposited to cover the signal transfer unit 220 except for the connection portion 221.

A conductive portion 240 may be filled in an empty space on the connection portion 221, allowing the connection portion 221 to be electrically connected to the flexible printed circuit board 181. The conductive portion 240 may be formed of Anisotropic Conductive Film (ACF) or Anisotropic conductive Paste (ACP). The ACF and the ACP may have a form that conductive particles are contained in an adhesive element so as to electrically connect the connection portion 221 to the flexible printed circuit board 181.

FIGS. 6A to 6D are process views showing a fabricating method for implementing a touch input structure on the window 151b shown in FIG. 4 and the edge region of the window 151b. The right planar view conceptually shows one touch pattern layer for the sake of explanation of a connection between the touch pattern unit 210 and the signal transfer unit 220.

Referring to FIGS. 6A to 6D with FIG. 4, the touch pattern unit 210, which defines a sensing channel for a touch input applied onto the central region C of the window 151b, may be formed on the window 151b. The touch pattern unit 210 may first be formed on the sleek window 151b prior to formation of the colored layer 230, which allows for a more increase on deposition temperature and a decrease of resistance of electrodes by virtue of the high temperature deposition. Also, because the process is prior to forming the colored layer 230, there may be no concern about happening of issues which may appear when the touch pattern unit 210 is formed after formation of the colored layer 230.

An upper surface of the touch pattern unit 210 may always have a uniform height from the window 151b at a random position. That is, the touch pattern unit 210 may be disposed to cover only the window 151b, so forming a layer parallel to the window 151b.

Afterwards, the signal transfer unit 220, namely, a routing electrode, which is electrically connected to the touch pattern unit 210 to define a signal transfer path, may be formed on the edge region S surrounding the central region C. The signal transfer unit 220 may be made of a colored material, implementing a color of the edge region S by being externally exposed via the edge region S.

The signal transfer unit 220 may cover one end portion of the touch pattern unit 210, and be bent at at least one point of the edge region S to be congregated at a terminal part 222. The signal transfer unit 220 may be patterned on the sleek window 151b prior to formation of the colored layer 230. This may allow for implementation of a precise electrode less than 30 μm.

Next, the connection portion 221 of the signal transfer unit 220, which is electrically connected to a flexible printed circuit board 181, may be masked, and thereafter the colored layer 230 which covers the edge region S may be printed or deposited to be filled in a space between the signal transfer units 220. The colored layer 230 may implement the color of the edge region S together with the signal transfer unit 220, and have the same color as the signal transfer unit 220 to visually provide a unity to the edge region S.

Afterwards, the connection portion 221 may be unmasked, and the conductive portion 240 may be filled in an empty space on the connection portion 221, thereby electrically connecting the connection portion 221 to the flexible printed circuit board 181. The conductive portion 240 may be implemented as the anisotropic conductive film as aforementioned. The anisotropic conductive paste may also be used to fill the empty space on the connection portion 221.

The touch input structure implemented on the window 151b may form a touch window module.

Figure 7:
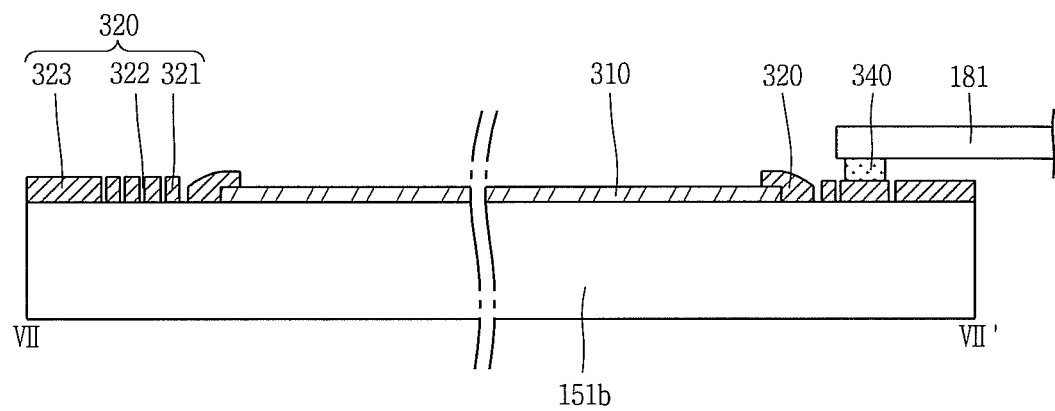
FIG. 7 is a sectional view showing another exemplary embodiment of the window shown in FIG. 3.
Figure 8A:
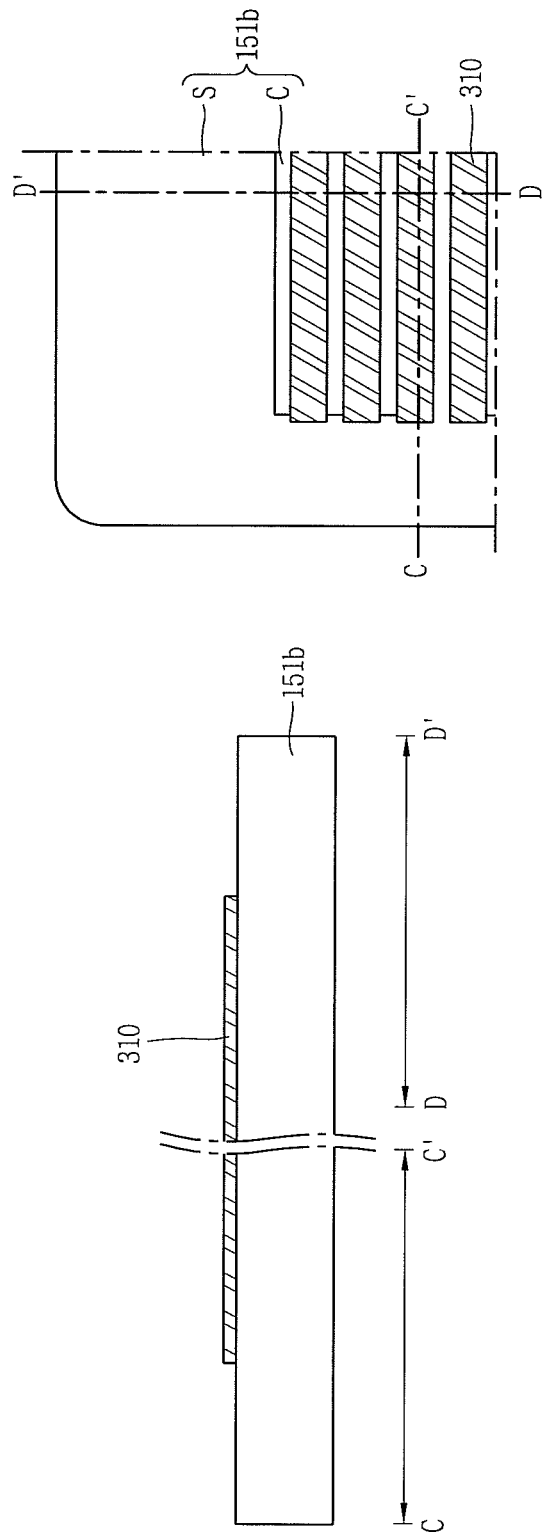
FIGS. 8A to 8D are process views showing a fabricating method for implementing a touch input structure on a window shown in FIG. 7 and an edge region of the window.
Figure 8B:
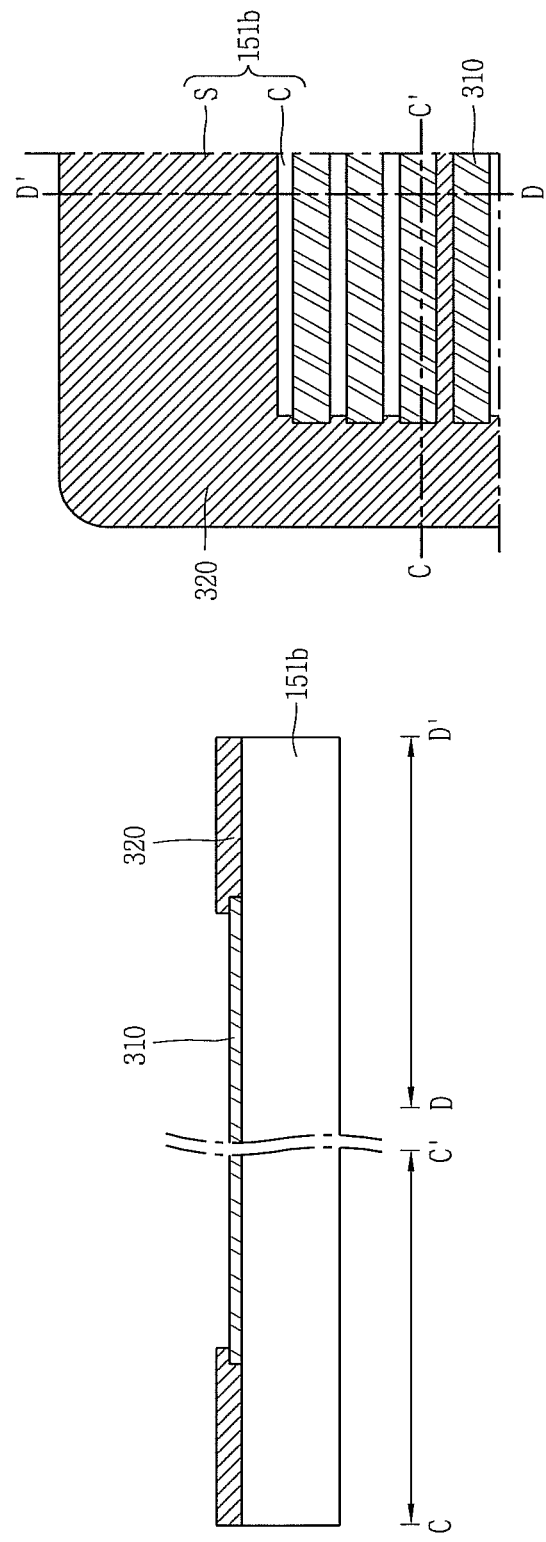
Figure 8C:
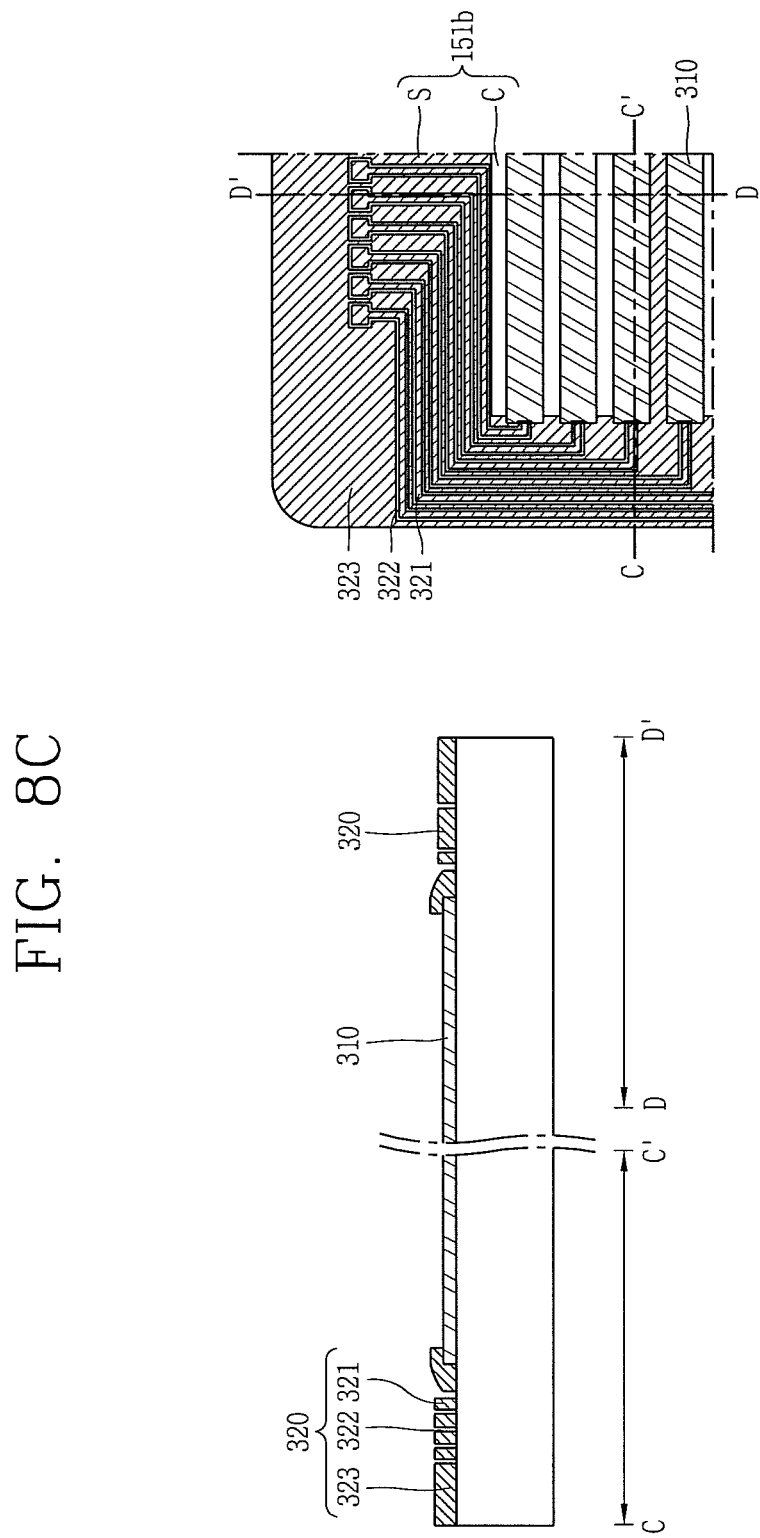
Figure 8D:
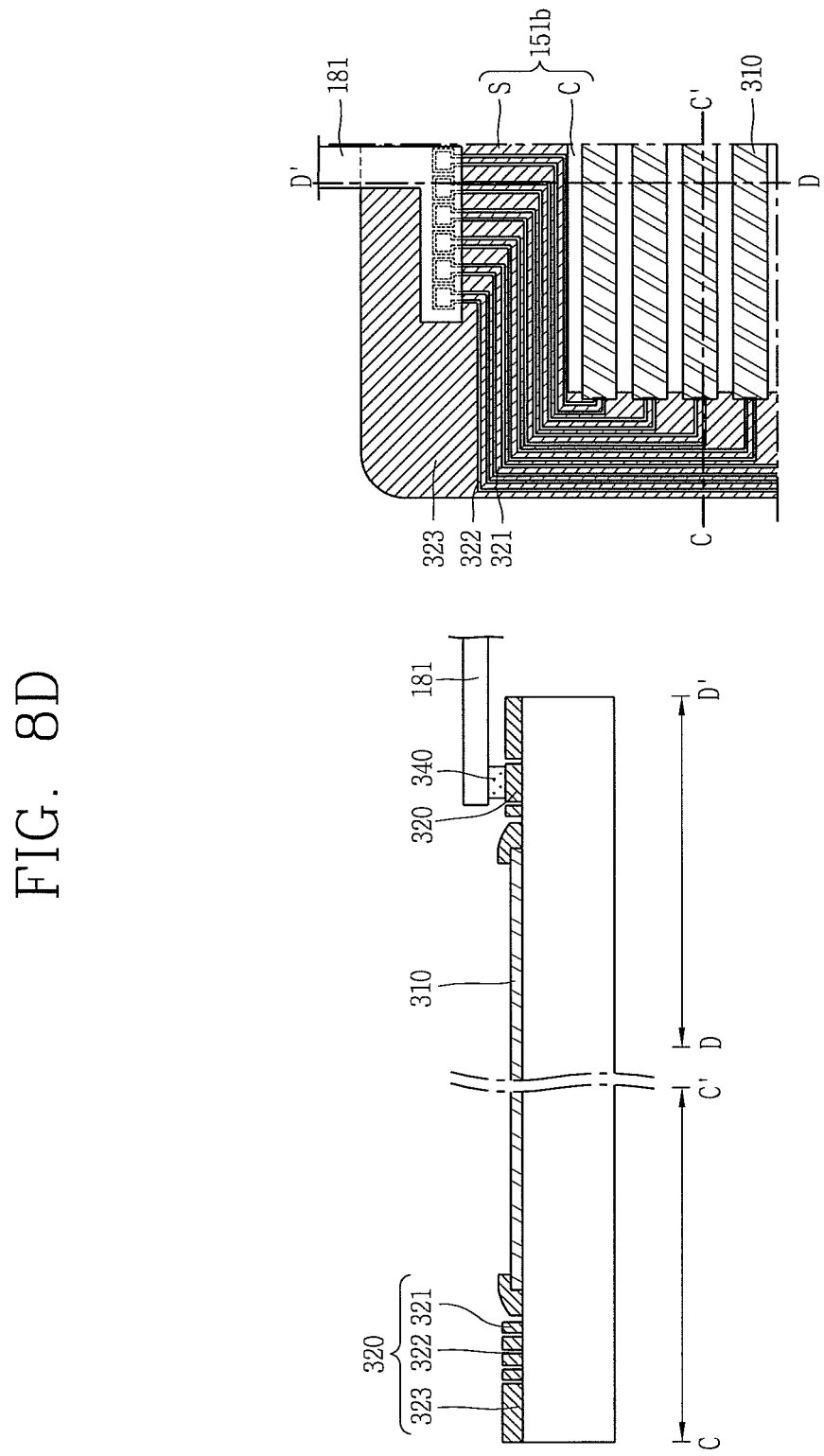

FIG. 7 is a sectional view showing another exemplary embodiment of the window 151b shown in FIG. 3, and FIGS. 8A to 8D are views showing processes of a fabricating method of implementing a touch input structure on the window 151b of FIG. 7 and an edge region of the window 151b. Hereinafter, the same/like reference numerals to the previous exemplary embodiment will be given to those of the another exemplary embodiment, and the first description will be helpful for understanding of the another exemplary embodiment.

Referring to FIGS. 7 and 8, a signal transfer unit 320 may fully occupy the edge region S, thereby forming the edge region S to be distinguishable from the central region C in view of a color. For example, the signal transfer unit 320 may be formed as a melanized electrode layer and deposited on the edge region S, implementing an opaque color of the edge region S.

The signal transfer unit 320 may include a routing electrode 321, an etched portion 322 and a dummy electrode 323.

The routing electrode 321 may be electrically connected to a touch pattern unit 310 to define a signal transfer path. The routing electrode 321 may cover one end portion of the signal transfer unit 320.

The etched portion 322 may electrically separate the signal transfer units 320 along sensing channels so as to form the routing electrodes 321 having different paths. The etched portion 322 may be formed as a fine recess which is hard to be seen by the naked eye. Hence, when the window 151b is shown from the outside, it may look as if the entire edge region S is covered with a specific color of the routing electrode 321 and the dummy electrode 323.

The dummy electrode 323 may be electrically separated from the touch pattern unit 310 by the etched portion 322, and define an appearance of the edge region S together with the routing electrode 321. That is, the dummy electrode 323 may have the same configuration as the routing electrode 321 excluding that it is not electrically connected to the touch pattern unit 310. The dummy electrode 323 may implement the color of the edge region S which has the same color as the routing electrode 321.

According to the configuration and the fabricating method according to the present disclosure, the signal transfer unit 320 may form the signal transfer path by being divided into the routing electrode 321 and the dummy electrode 323 by virtue of the etched portion 322, and simultaneously implement the color of the edge region S by itself. This may result in more simplifying the touch input structure on the window 151b and reducing a thickness of the window 151b. Also, a printing process of a colored layer may not be required so as to improve a process yield ratio, resulting in providing a mobile terminal 100 having a touch input structure with more improved reliability.

Figure 9:
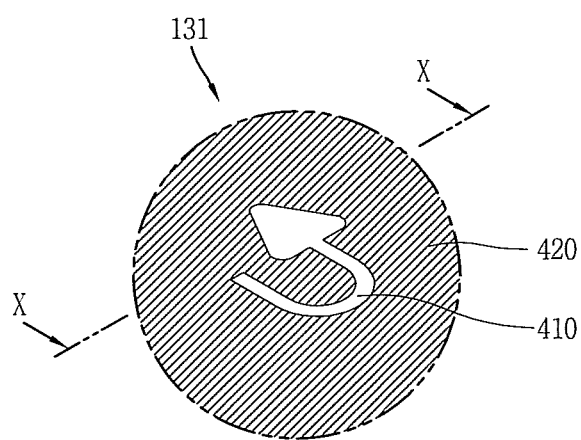
FIG. 9 is an enlarged view of a part A shown in FIG. 3.
Figure 10:
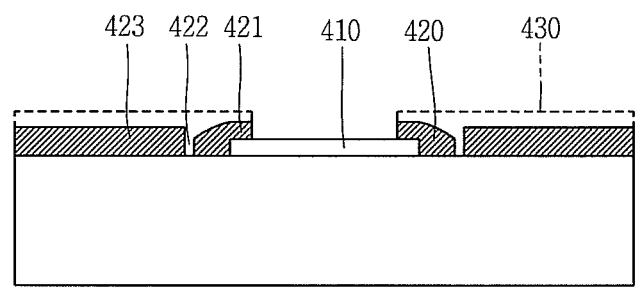
FIG. 10 is a sectional view taken along the line X-X of FIG. 9.

FIG. 9 is an enlarged view showing a part A shown in FIG. 3, and FIG. 10 is a sectional view taken along the line X-X of FIG. 9.

As shown in FIGS. 9 and 10, a touch pattern unit 410 may extend toward the edge region S to sense a touch input applied onto the edge region S. For example, the touch pattern unit 410 may be formed on the window 151b at a portion corresponding to the first manipulation unit 131, which is disposed on a lower end of the terminal body, so as to sense a touch input applied onto the first manipulation unit 131.

The first manipulation unit 131 may be indicated with a specific image (for example, an icon such as menu, call, end, etc.) on the window 151b. The image may be colorless and transparent within the colored edge region S.

To this end, a colored signal transfer unit 420 may surround the first manipulation unit 131 to form the image. From the perspective of a fabricating process, a method of forming the signal transfer unit 420 by masking a portion corresponding to the image and forming a signal transfer path that the signal transfer unit 420 and the touch pattern unit 410 are electrically connected to each other may be employed.

To form the image and the edge region S, as aforementioned, a method of printing or depositing a colored layer 430 or a method of forming a routing electrode 421 and a dummy electrode 423 through formation of an etched portion 422 may be employed.

Figure 11:
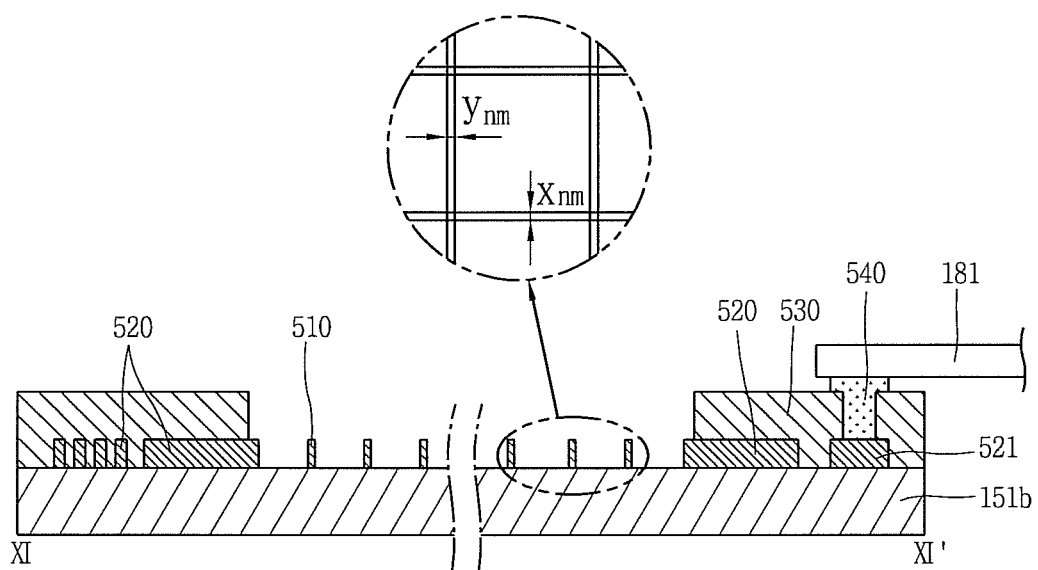
FIGS. 11 and 12 are sectional views showing variations of the windows shown in FIGS. 4 and 7, respectively.
Figure 12:
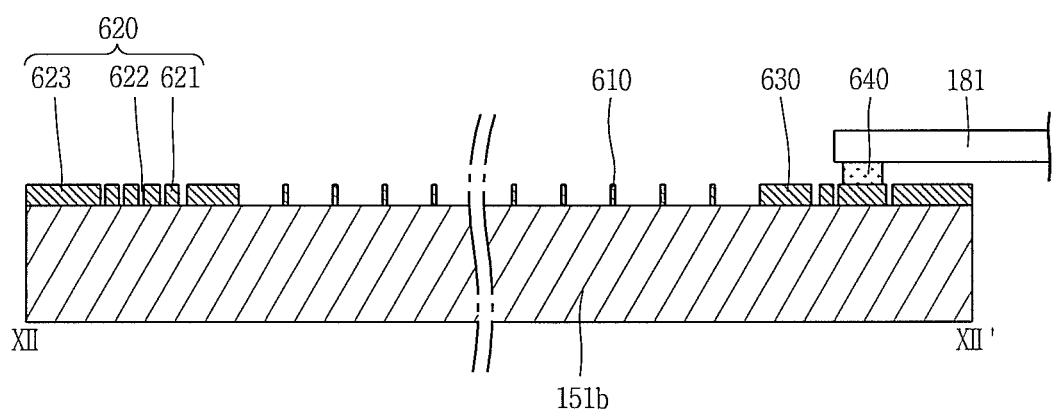

FIGS. 11 and 12 are sectional views showing variations of the window 151*b* shown in FIGS. 4 and 7, respectively. FIG. 11 shows that a colored layer 530 forms an appearance of an edge region S together a the signal transfer unit 520, and FIG. 12 shows that a signal transfer unit 620 itself defines an appearance of an edge region S without a colored layer 520.

As shown in FIGS. 11 and 12, the touch pattern unit 510, 610 may be formed of the same material as the signal transfer unit 520, 620 to define a specific pattern. The touch pattern unit 510, 610 may be formed with the same colored material as the signal transfer unit 520, 620, but not cause an interference with visual information output on the display 151*a*. That is, the touch pattern unit 510, 610 may be configured such that a user cannot recognize it by the naked eyes.

To implement this, the touch pattern unit 510, 610 may include nano-scale metal lines forming a grid at a portion corresponding to the display 151*a* of the window 151*b*. For example, nano-scale copper lines may form a sensing channel for a touch input by being patterned into a mesh form on a rear surface of the window 151*b*. The structure may have an advantage in the aspect of replacing ITO transparent electrode, which contains indium as a high-priced rare metal called a rare-earth metal.

The touch pattern unit 510, 610 and the signal transfer unit 520, 620 may be implemented by the same process other than different processes. For example, a colored material may be deposited on a rear surface of the window 151*b*, and then etched or masked, if necessary, thereby forming the touch pattern unit 510, 610 and the signal transfer unit 520, 620. Here, the colored material, which is deposited (or printed or the like) on the edge region S to be visible by the naked eye may form the signal transfer unit 520, 620, and the colored material patterned on the central region C to be invisible by the naked eye may form the touch pattern unit 510, 610. The touch pattern unit 510, 610 and the signal transfer unit 520, 620 may have the same thickness on the window 151*b*.

According to the configuration and the fabricating method according to the present disclosure, a signal transfer unit may be formed of a colored material and outwardly exposed via an edge region, so as to implement a color of the edge region together with a colored layer or by itself, implementing more simplified and thickness-reduced touch input structure on a window.

Also, the shortcomings caused by employing the conventional structure and fabricating method, such as discoloration of a colored layer upon deposition of a touch pattern, damage on the colored layer upon etching, damage on the touch pattern due to a stepped portion and the like, may be avoided, implementing a precise routing electrode. This may result in providing a mobile terminal having a touch input structure with improved process yield ratio and reliability.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a display;
a window to cover the display and to be outwardly exposed to form an outer surface of the mobile terminal, the window having a central region and an edge region;
a touch pattern unit on a rear surface of the window opposite to a front surface forming the outer surface of the mobile terminal, the touch pattern unit to define a sensing channel for a touch input applied onto the central region of the window; and
a signal transfer unit to cover at least a portion of the edge region of the window, the signal transfer unit to electrically connect to the touch pattern unit and provide a signal transfer path,
wherein the signal transfer unit includes:
a routing electrode to electrically connect the touch pattern unit to a circuit board,
an etched portion to electrically separate each signal transfer unit along the sensing channel to form the routing electrode having a different path, and
a dummy electrode to be electrically separated from the touch pattern unit by the etched portion, and
wherein the routing electrode and the dummy electrode are formed of a same colored material and are outwardly exposed from the edge region of the window to define an appearance of the edge region.

2. The mobile terminal of claim 1, wherein the signal transfer unit includes:
a base formed of a conductive material to provide a current flow; and
a colored layer to provide a color over the edge region of the window.

3. The mobile terminal of claim 1, wherein the touch pattern unit extends into the edge region and forms an image based on the signal transfer unit over the touch pattern unit, and the touch pattern unit to sense a touch input at the image.

4. The mobile terminal of claim 1, wherein the touch pattern unit is formed of a same material as the signal transfer unit to form a specific pattern, wherein the touch pattern unit includes nano-scale metal lines that form a grid on a portion of the window corresponding to the display.

5. A mobile terminal comprising:
a display;
a window on the display and exposed to outside to form an outer surface of the mobile terminal, the window having an edge region;
a touch pattern layer on a rear surface of the window opposite to a front surface forming the outer surface of the mobile terminal, and the touch pattern layer configured to provide a sensing channel for a touch input; and a signal transfer unit, formed of a color, to cover at least a portion of the edge region of the window, the signal transfer unit to form a signal transfer path from the touch pattern layer, wherein the signal transfer unit includes:
- a routing electrode to electrically connect the touch pattern layer to a circuit board,
- an etched portion to electrically separate each signal transfer unit along the sensing channel to form the routing electrode having a different path, and
- a dummy electrode to be electrically separated from the touch pattern layer by the etched portion, and
- wherein the routing electrode and the dummy electrode are formed of a same colored material and are outwardly exposed from the edge region of the window to define an appearance of the edge region.

6. The mobile terminal of claim 5, wherein the signal transfer unit includes:
- a conductive base to provide a current flow; and
- a colored layer over the edge region of the window.

7. The mobile terminal of claim 5, wherein the touch pattern layer extends into the edge region and forms an image based on the signal transfer layer over the touch pattern layer, and the touch pattern layer to sense a touch input at the image.

8. The mobile terminal of claim 5, wherein the touch pattern layer is formed of a same material as the signal transfer unit and forms a specific pattern, and wherein the touch pattern layer includes nano-scale metal lines on a portion of the window corresponding to the display.

9. A method for fabricating a mobile terminal comprising:
- providing a touch pattern unit on a rear surface of a window opposite to a front surface forming an outer surface of the mobile terminal, and the touch pattern unit configured to provide a sensing channel for a touch input applied onto a central region of the window;
- providing a signal transfer unit on an edge region of the window;
- etching the signal transfer unit along the sensing channel; and
- electrically connecting the signal transfer unit to a flexible printed circuit board, wherein the signal transfer unit is separated by the etching into:
- a routing electrode to electrically connect the touch pattern unit to the flexible printed circuit board; and
- a dummy electrode to be electrically separated from the touch pattern unit, and
- wherein the routing electrode and the dummy electrode are formed of a same colored material and are outwardly exposed from the edge region of the window to define an appearance of the edge region.

\* \* \* \* \*